United States Patent [19]

Carroll

[11] 4,321,791

[45] Mar. 30, 1982

[54] ELECTRONIC FUEL CONTROL SYSTEM FOR A GAS TURBINE ENGINE

[75] Inventor: Robert J. Carroll, Plano, Tex.

[73] Assignee: Eaton Corporation, Cleveland, Ohio

[21] Appl. No.: 106,778

[22] Filed: Dec. 26, 1979

[51] Int. Cl.³ .............................................. F02C 9/04
[52] U.S. Cl. ......................... 60/39.14 R; 60/39.28 R
[58] Field of Search .................... 60/39.14 R, 39.28 R

[56] References Cited

U.S. PATENT DOCUMENTS

| | | | |
|---|---|---|---|
| 3,381,470 | 3/1969 | Hammerstein. | |
| 3,478,512 | 5/1970 | Brahm et al. | |
| 3,520,133 | 7/1970 | Loft et al. | 60/39.14 R |
| 3,606,754 | 9/1971 | White | 60/39.14 R |
| 3,893,291 | 12/1971 | Davis et al. | |
| 3,902,315 | 9/1975 | Martin | 60/39.14 R |
| 4,044,554 | 8/1977 | West | 60/39.14 R |
| 4,134,258 | 1/1979 | Hobo et al. | 60/39.14 R |
| 4,167,095 | 9/1979 | Fukuda | 60/39.14 R |

Primary Examiner—Robert E. Garrett
Attorney, Agent, or Firm—C. H. Grace; R. A. Johnston; J. G. Lewis

[57] ABSTRACT

An electronic fuel control system for controlling the rate at which fuel is supplied to a gas turbine engine which controls turbine speed, acceleration, and combustor temperature as a function of ambient temperature and turbine speed. A predetermined fuel schedule controls the maximum and minimum amount of fuel supplied to the gas turbine engine during transient and steady-state operation, and sequences operation from a starting fuel schedule to a running fuel schedule. A transient fuel boosting function temporarily overrides the temperature limit control when a speed increase is called for.

5 Claims, 9 Drawing Figures

Q – Fuel Flow
T – Turbine Temperature
N – Turbine Shaft Speed

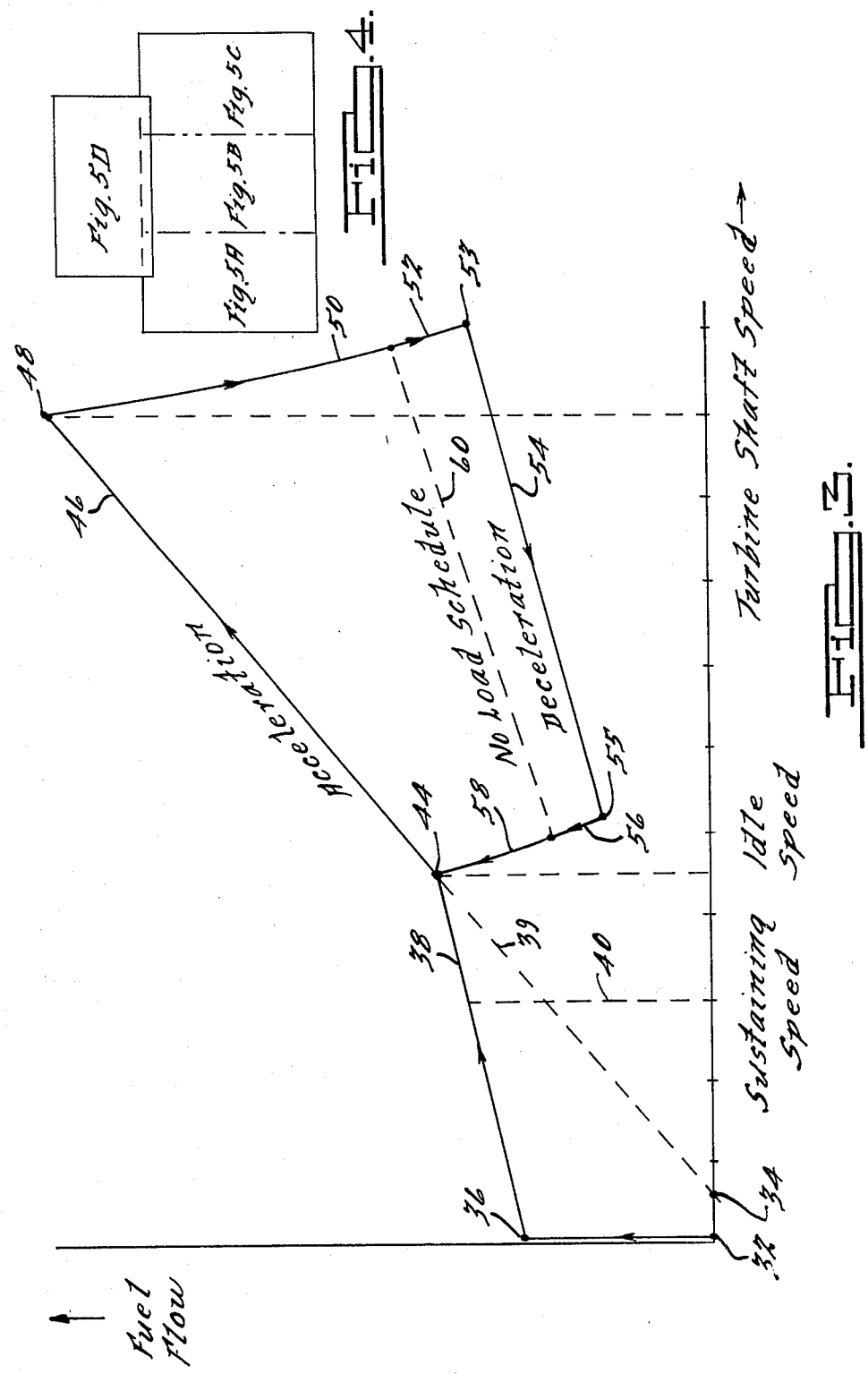

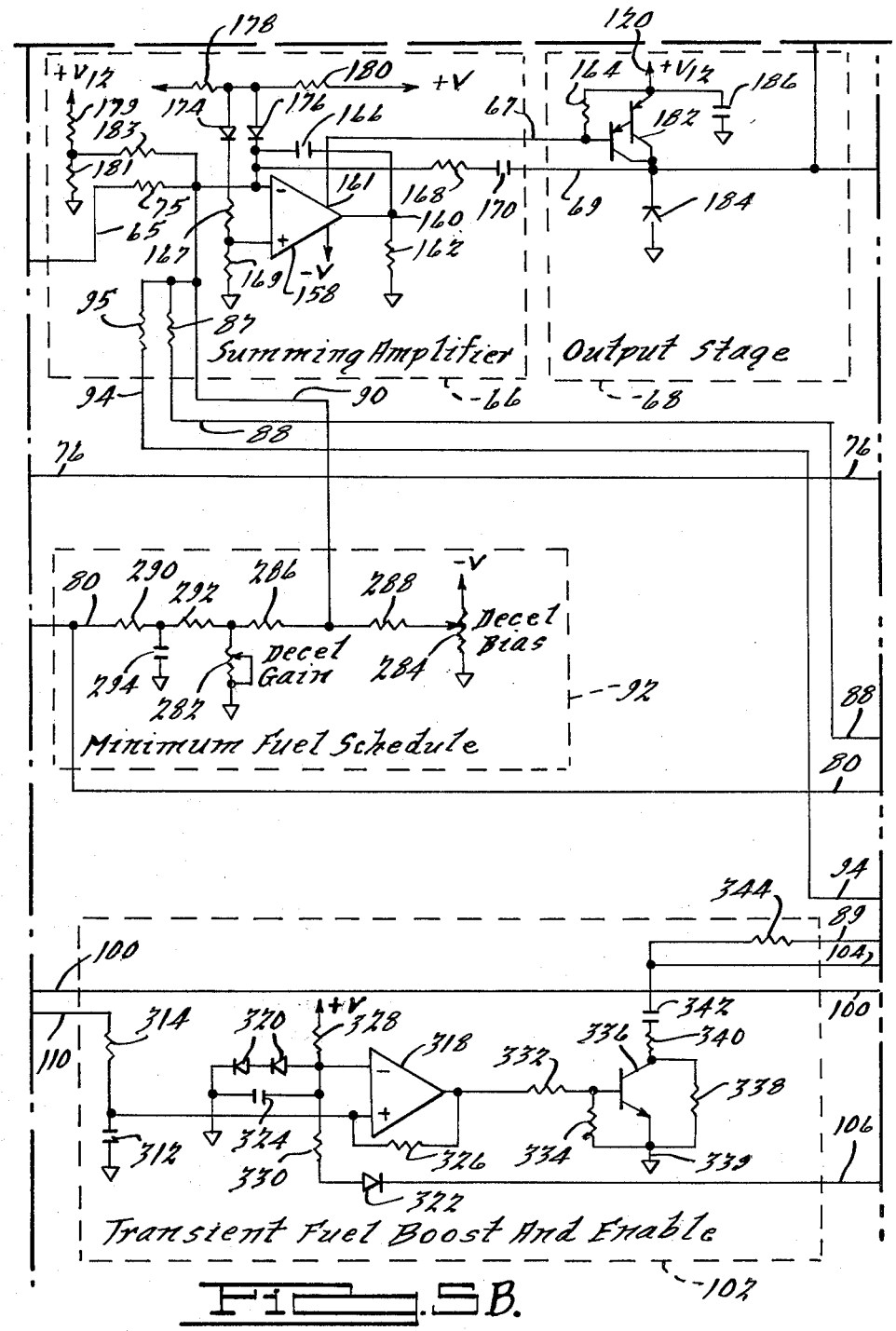

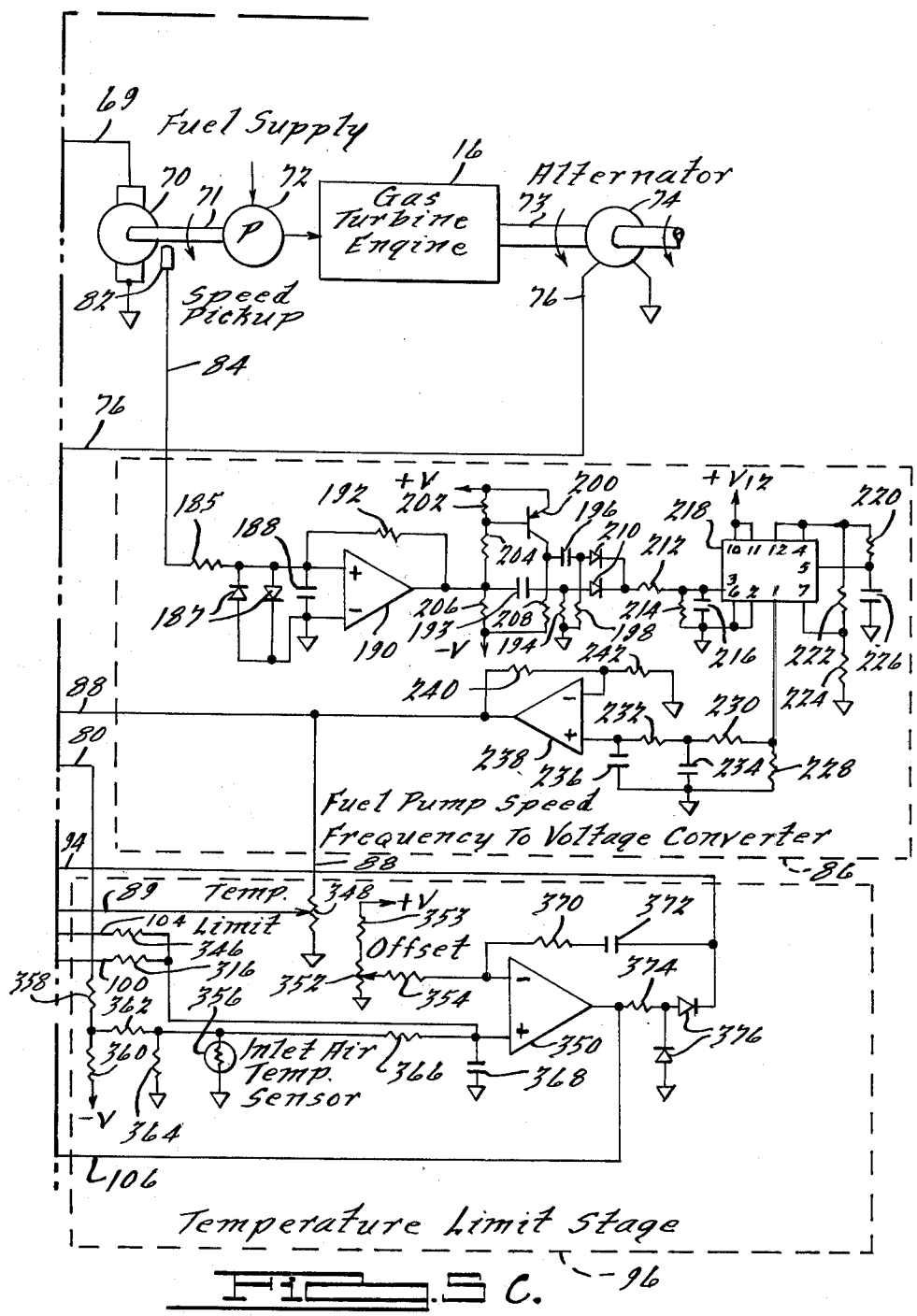

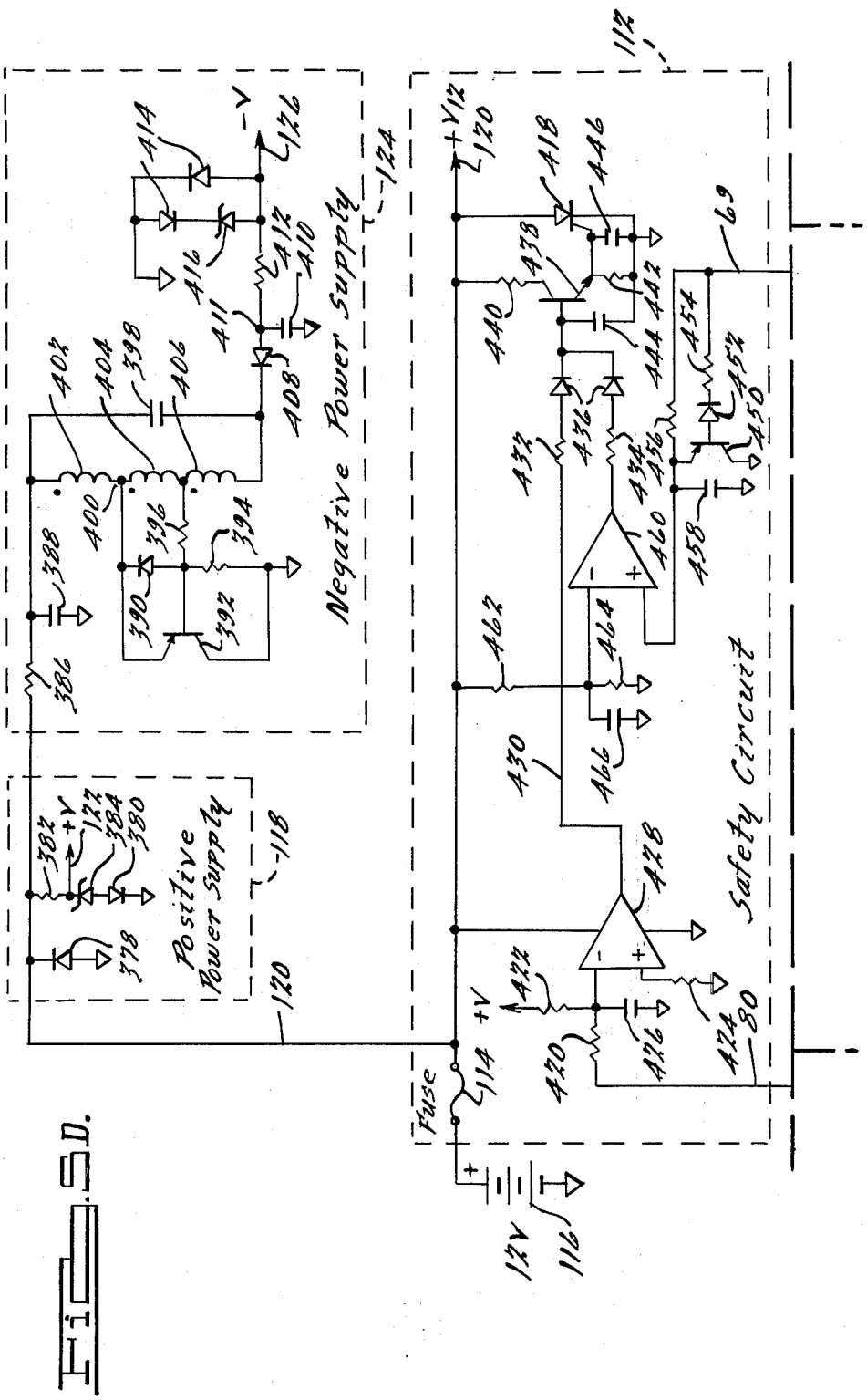

ELECTRONIC FUEL CONTROL SYSTEM FOR A GAS TURBINE ENGINE

BACKGROUND OF THE INVENTION

1. Field of the Invention

The present invention relates generally to fuel control systems for gas turbine engines and more specifically to those systems which effect the control of fuel flow rate through the use of electronic circuitry.

2. Description of the Prior Art

Heretofore electronic fuel controls systems for gas turbine engines have been unattractive in low cost applications where good speed performance and combustor temperature limiting are necessary or desirable. One major reason for this has been that the approach taken to controlling fuel flow has generally been to throttle the relatively constant flow of a fixed positive displacement engine mounted pump. This necessitates the use of an electrohydraulic servovalve or a motorized valve which valves may be slow acting and are generally complex and expensive. Furthermore, such approaches are not power conservative in that the fuel throttled out must be bypassed at low pressure, carrying off the heat generated by the waste fluid power.

Still other disadvantages in the use of presently available electronic fuel controls stem from the complicated electronic circuitry that has been required (ref. U.S. Pat. Nos. 2,948,114 and 2,963,860) to effect temperature limiting, acceleration override control, and minimum operational limiting during deceleration.

Further disadvantages of prior art electronic fuel control systems include the requirement of expensive and specialized sensors such as to provide an electrical signal proportional to compressor discharge pressure or to sense and provide a signal proportional to combustor temperature (see, e.g. U.S. Pat. Nos. 4,087,961 and 3,381,470). In addition to attempting to monitor the high temperature in the combustor, the use of thermocouples in this manner introduces an error signal between the temperature of the combustor and the temperature of the thermocouple which manifests itself in a time lag which must then be compensated for (ref. U.S. Pat. No. 3,893,291); i.e., the thermocouple output will lag the actual combustor temperature and would result in combustor overtemperature if left uncompensated.

BRIEF DESCRIPTION OF THE INVENTION

Accordingly it is an object of the present invention to provide a fuel control system for a gas turbine engine having superior performance characteristics.

A more specific object is to provide a fuel control which provides excellent acceleration characteristics while retaining effective protection against combustor overtemperature.

The invention fuel control system is of the type wherein fuel is supplied in response to a speed demand signal and in accordance with a predetermined fuel schedule. According to the invention, the control system includes start mode means, which operate to sequence the predetermined fuel schedule from a starting fuel schedule to a running fuel schedule, and fuel boost means which are held inoperative by the start mode means during the starting fuel schedule but are operative during the running fuel schedule, in response to an increased speed demand signal, to transiently increase the amount of fuel supplied in excess of that called for by the fuel schedule.

This arrangement provides a fuel control system which provides excellent acceleration characteristics while retaining effective protection against combustor overtemperature.

Other features and advantages of this invention will become apparent upon reading the following specification, which, along with the accompanying drawings, describes and discloses the preferred embodiment of the invention in detail.

The specification makes reference to the accompanying drawings.

BRIEF DESCRIPTION OF THE DRAWINGS

The description of the preferred embodiment makes reference to the accompanying drawings in which:

FIG. 4 is a drawing key showing the interrelationships of FIGS. 5A through 5D; and FIGS. 5A through 5D collectively comprise an electrical schematic of the electronic fuel control system including connections to the mechanical portions of the gas turbine fuel control system.

DESCRIPTION OF THE PREFERRED EMBODIMENT

1. General Overview

Figure 1:
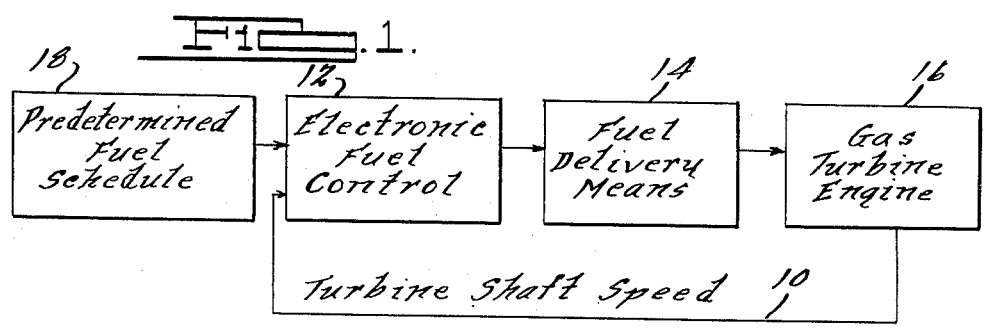
FIG. 1 is a block diagram of the electronic fuel control system of the present invention.

Referring to FIG. 1, a block diagram of an electronic fuel control system for a gas turbine engine is illustrated. The principal control loop of this system is a turbine speed control which utilizes feedback of turbine shaft speed 10, sensed at a gas turbine engine 16. An electronic fuel control 12 provides the necessary fuel to gas turbine engine 16 through a fuel delivery means 14 subject to limiting by a sequenced predetermined fuel schedule 18, which protects against combustor overtemperature, and provides for proper operation during startup.

Combustor temperature control is effected by regulating the amount of fuel provided to turbine 16 as a function of turbine shaft speed 10. Fuel delivery means 14 must precisely meter fuel to turbine 16 in proportion to its input signal from electronic fuel control 12. The preferred embodiment of the present invention achieves this by means of a fixed positive-displacement fuel metering pump 72 (See FIG. 5C) which meters fuel to turbine 16 in exact proportion to fuel metering pump speed.

Figure 2A:
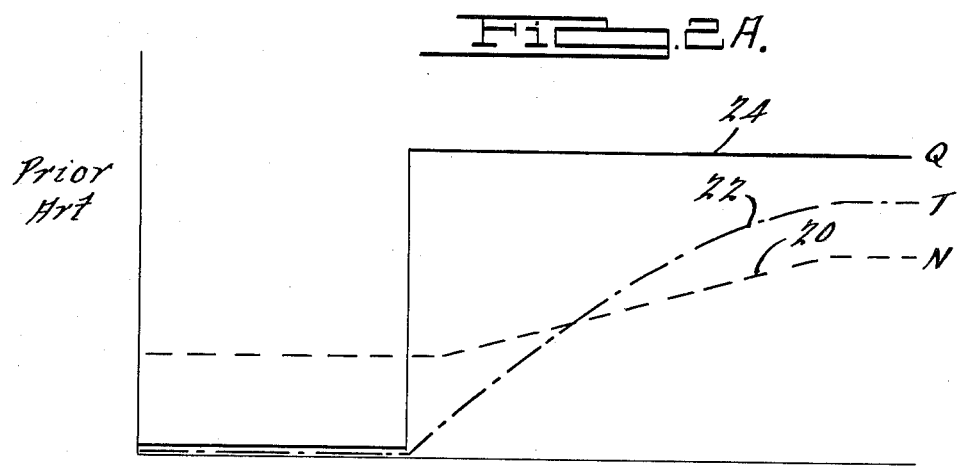
FIGS. 2A and 2B illustrate fuel flow, turbine shaft speed, and turbine temperature response characteristics of a prior art turbine fuel control and the electronic fuel control of the present invention, respectively, during an abrupt increase in demanded speed.
Figure 2B:
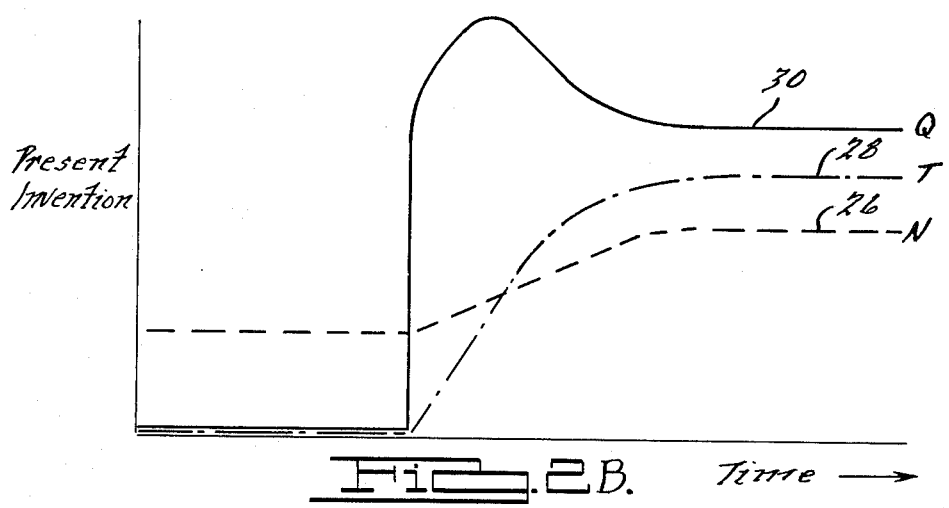

Referring to FIGS. 2A and 2B, prior art turbine fuel controls have time characteristics of turbine shaft speed 20 and turbine temperature 22 of the combustor in response to an increase in fuel flow 24. The present invention effects a more rapid rate of change of turbine shaft speed 26 while still limiting turbine temperature 28 by control of fuel flow 30. If an increase is demanded in turbine speed, a prior art system will exhibit at best a step increase in fuel flow 24. This step increase in fuel flow 24 will result in gradual time dependent increases in turbine temperature 22 and turbine shaft speed 20. By means of the present invention when a speed increase is called for, transient fuel boosting is effected in fuel flow 30, resulting in much improved performance of turbine shaft speed 26, while still not allowing turbine temperature 28 to exceed a safe value. It should be noted that initial and final steady-state values for fuel flows 24 and 30, turbine temperatures 22 and 28, and turbine shaft speeds 20 and 26 are the same in FIGS. 2A and 2B, but that transient performance of turbine shaft speed 26 of the present invention is substantially improved over that of the prior art.

Figure 3A:
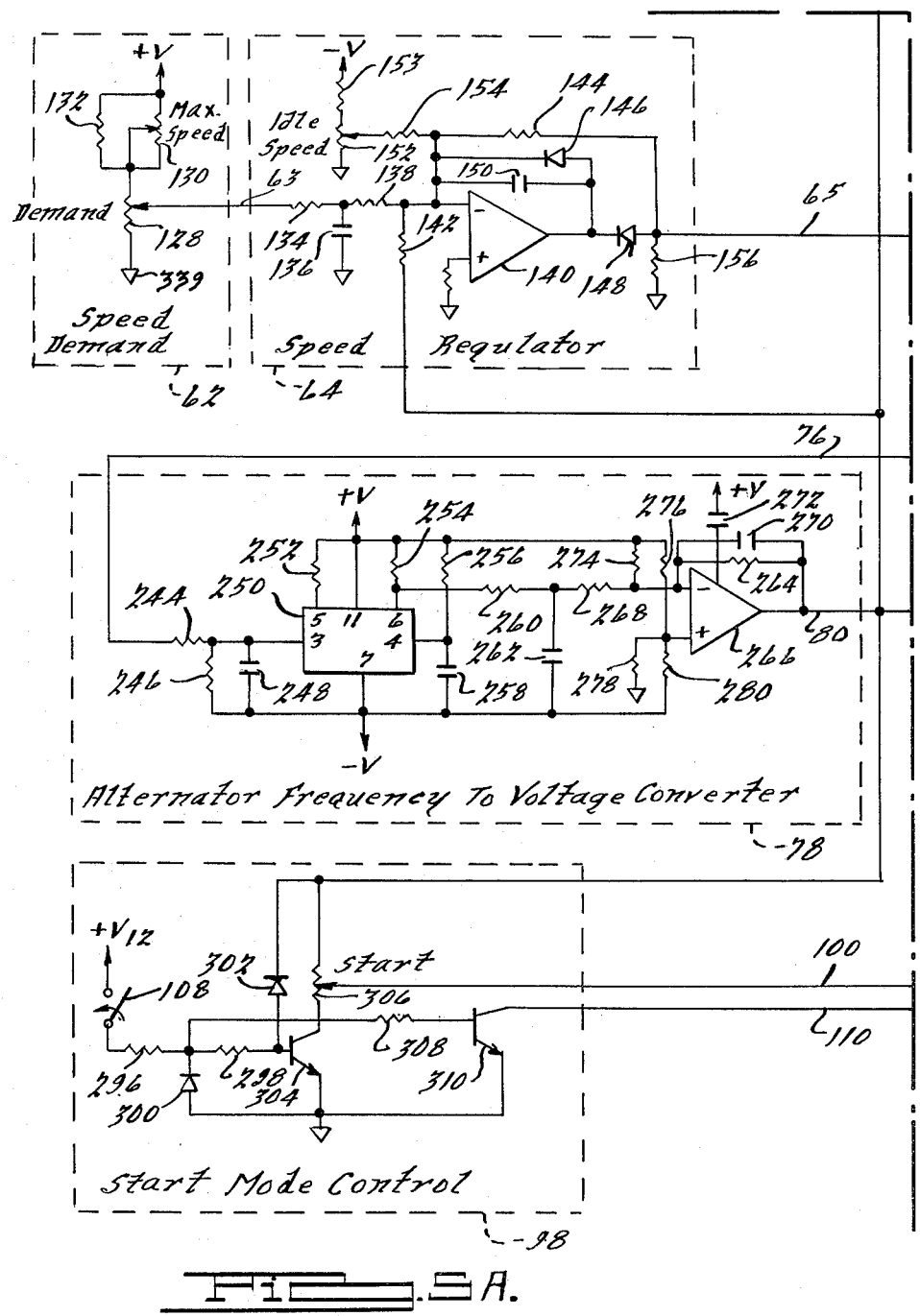
FIG. 3 is a sequenced predetermined fuel schedule showing fuel flow versus turbine shaft speed of the present invention.

Referring to FIG. 3, a sequenced predetermined fuel schedule of fuel flow versus turbine shaft speed is shown. This schedule represents the manner in which the fuel control system of the present invention sequences and regulates fuel supplied to turbine engine 16. The sequence of operation is as follows: Starting at the origin 32, turbine 16 is at rest and no fuel is flowing. A start switch 108 (shown in FIG. 5A) is closed and a starter motor (not shown) begins to accelerate turbine engine 16. As soon as start switch 108 is closed, the fuel control system switches from no fuel flow at point 32 to a minimum fuel flow at point 36. Start switch 108 is held closed until turbine speed is above its sustaining speed 40. Start switch 108 may then be released. Operation will proceed along segment 38 until start switch 108 is released, when it will drop to segment 39 and proceed along segment 39 and 46 if full acceleration is called for up to full load full speed point 48. Restricting operation to segment 46 will limit combustor temperature to a safe value. Operation along segment 38 is possible because of the low combustor temperature prior to starting and occurs only during the initial acceleration upon start-up and only while the start switch 108 is maintained closed.

Subsequent to start-up, steady-state full load fuel flow is restricted to the schedule of segment 46, permitting operation between full load idle speed point 44 and full load maximum speed point 48. The slope of fuel schedule segments 50 and 58 (shown somewhat exaggerated in FIG. 3) is due to turbine speed droop in response to load and is representative of the finite gain of the principal control loop. The no-load fuel characteristic of the turbine 16 is illustrated by segment 60. In order to obtain the most rapid deceleration possible without losing combustion, minimum fuel flow to turbine 16 is limited to a minimum fuel flow schedule segment 54. The slope and offset of segements 38, 46, and 54 are adjustable in the preferred embodiment to tailor the starting, maximum, and minimum fuel schedules as desired to match the characteristics of turbine 16.

2. System Functions

Referring particularly to FIGS. 5A through 5D there are 13 functional electronic circuits in addition to the mechanical section of this turbine fuel control system. The principal control loop regulates the speed of an output shaft 73 of turbine 16, shown generally in FIG. 1 and more detail in FIG. 5C. The circuits comprising the principal control loop are as follows: A speed demand circuit 62 provides a speed demand or desired turbine shaft speed signal on lead 63. The signal on lead 63 provides a reference to a speed regulator circuit 64. In addition, speed regulator circuit 64 receives a feedback signal on lead 80 (hereinafter denoted "AFV signal" for alternator frequency to voltage signal) proportional to the speed of output shaft 73 of turbine 16. Speed regulator circuit 64 provides a turbine speed error signal on lead 65 which is combined with other signals in a summing amplifier circuit 66. Summing amplifier circuit 66 provides an output on lead 67 to an output stage circuit 68 which provides power to a fuel pump motor 70 through lead 69. Fuel pump motor 70 is a fixed-field direct-current motor which drives fuel metering pump 72 through a shaft 71 in response to the signal on lead 69. To satisfy the principal control loop, fuel metering pump 72 provides an appropriate amount of fuel to turbine 16 sufficient to maintain the speed of output shaft 73 at a level demanded by the desired turbine shaft speed signal on lead 63. In addition to powering a load (not shown), output shaft 73 drives an alternator 74 providing a turbine speed feedback signal on lead 76 whose frequency is proportional to the speed of output shaft 73. The alternator frequency to voltage converter circuit 78 provides an analog voltage (AFV signal) on lead 80 proportional to the frequency of alternator 74 and hence proportional to the speed of output shaft 73. The AFV signal on lead 80 in FIGS. 5A through 5D corresponds to turbine shaft speed 10 in FIG. 1.

Within the principal control loop regulating turbine speed, there is a minor loop, a fuel metering pump speed control loop, regulating the speed of fuel metering pump 72. This minor loop is described as follows: The algebraic combination in summing amplifier circuit 66 of signals on leads 65, 90 and 94 comprise a reference for the fuel pump speed control loop. The speed of shaft 71 driving fuel metering pump 72 is sensed by a tachometer generator speed pickup 82 providing a fuel pump speed feedback signal on lead 84 whose frequency is proportional to the speed of fuel metering pump 72. A fuel pump frequency to voltage converter circuit 86 provides an analog voltage signal (FPFV signal for fuel pump frequency to voltage signal) on lead 88 proportional to the speed of fuel pump 72. Summing amplifier circuit 66 provides error detection and correction for the minor loop. Output stage circuit 68, leads 67 and 69, and fuel metering pump motor 70 complete the minor loop. It may be noted that the signal on lead 67 contains control information for both the minor loop and the principal control loop.

A temperature limit stage circuit 96 protects against combustor overtemperature by regulating the maximum amount of fuel that can be supplied to turbine 16 as a function of speed of output shaft 73. Temperature limit stage circuit 96 is effective to provide an output on lead 94 only when a high load exists on output shaft 73 calling for a fuel flow in excess of the maximum schedule of segments 38 and 46 of FIG. 3. At other times there is no output on lead 94 and the minor and principal loops are unaffected by temperature limit stage circuit 96.

Fuel flow is controlled along segment 54 of FIG. 3 during periods of rapid deceleration by a minimum fuel schedule circuit 92, receiving the AFV signal on lead 80 and providing an output on lead 90 to summing amplifier 66.

The starting sequence from the origin 32 in FIG. 3 is controlled by a start mode control circuit 98, (shown in FIG. 5A,) which receives the AFV signal on lead 80 and is responsive to the position of start switch 108. In addition to a start signal on lead 100, a "not enabled" signal is transmitted on lead 110 to transient fuel boost and enable circuit 102, (shown in FIG. 5B).

Transient fuel boost and enable circuit 102 provides the improved performance shown in FIG. 2B. While start switch 108 is maintained closed during initial acceleration upon start-up, circuit 102 is held "not enabled" by the signal on lead 110 and while "not enabled", circuit 102 has no effect on system performance. Once start switch 108 is opened, circuit 102 is in a condition to be enabled and will be enabled the first time that the electronic fuel control system comes out of a temperature limiting operating mode; that is, the first time that the system moves to an operating point below segment 46. Circuit 102 is "enabled" by a signal on lead 106. Once circuit 102 is "enabled", it will remain so until the start switch is again closed during a subsequent startup. When circuit 102 is in its "enabled" condition, it will add a low-pass filter characteristic to a temperature limit feedback signal path on leads 89 and 104. Each time a rapid increase in turbine speed demand occurs while operating in the temperature limiting mode (along segment 46), "enabled" circuit 102 will momentarily delay the signal on lead 104 in response to a change in the signal on lead 89, which will effect an overshoot characteristic in fuel flow 30, resulting in the performance improvement of a faster rate of change in turbine shaft speed 26. This performance improvement is made possible because of the thermal inertia of the combustor of the gas turbine engine 16. By permitting an overshoot in fuel flow, the thermal response is "forced" to its final steady-state value faster in time (but without overshoot) as shown by turbine temperature 28.

Referring particularly to FIG. 5D, a safety circuit 112 receives inputs on leads 80 and 69 and causes a shutdown of the electronic fuel control system upon detection of an unsafe condition of turbine overspeed or fuel metering pump overvoltage. A positive power supply circuit 118 receives an input from a nominal +12 volt ("+$V_{12}$") lead 120 and provides a nominal +5.6 volt ("+V") output 122. A negative power supply circuit 124 receives input from "+$V_{12}$" lead 120 and provides a nominal −5.6 volt ("−V") output on lead 126.

3. Detailed Description

A. Speed Demand

Referring again particularly to FIG. 5A, a DEMAND potentiometer 128 is connected between circuit common 339 (shown as an inverted triangle throughout the drawings) and a MAX-SPEED potentiometer 130 so as to provide a variable voltage on lead 63 proportional to the speed demanded of turbine engine 16. MAX-SPEED potentiometer 130 limits the voltage available across DEMAND potentiometer 128 in order to limit the maximum voltage that may appear on lead 63. A resistor 132 is connected across and varies the taper of MAX-SPEED potentiometer 130.

B. Speed Regulator

The speed demand signal on lead 63 is passed through a noise filter comprised of a resistor 134 and a capacitor 136 and summed into an operational amplifier (op amp) 140 by resistor 138. The AFV signal on lead 80 is summed into op amp 140 by a resistor 142. The turbine speed error signal on lead 65 is proportional to the algebraic sum of the speed demand (reference) and AFV (feedback) signals. The signal on lead 65 is prevented from having a positive polarity by a pair of diodes and 146 and 148. A capacitor 150 provides AC feedback around op amp 140, and a resistor 144 provides DC feedback around op amp 140 when diode 148 is conducting. The signal on lead 65 is further modified by being biased as a result of a signal from an IDLE SPEED potentiometer 152, limited by a resistor 153 and scaled by a resistor 154. A resistor 156 provides a low source impedance for the signal on lead 65 when diode 148 is reverse biased.

C. Summing Amplifier

Referring again to FIG. 5B, summing amplifier circuit 66 algebraically combines signals on leads 65, 88, and 94 respectively through input summing resistors 75, 87, and 95 and provides an output on lead 67 proportional to the algebraic sum of these signals combined with the signal on lead 90 which has summing resistors 286 and 288 in minimum fuel schedule circuit 92. Lead 67 is connected to a positive power supply terminal 161 of an op amp 158. When the voltage on an output terminal 160 of op amp 158 increases from zero in response to appropriate input signals, a load resistor 162 will cause current to flow through lead 67 into positive power supply terminal 161 of op amp 158 with a resulting reduction in resulting a reduction in voltage in the signal on lead 67 due to the voltage drop of an emitter cutoff resistor 164 in output stage circuit 68. A capacitor 166 acts as a noise supression capacitor for op amp 158. A resistor 168 and a capacitor 170 provide proportional plus integral feedback to op amp 158 from the signal on lead 69. Diodes 174 and 176 and resistors 178 and 180 sense the condition of positive and negative power supply circuits 118 and 124 and bias op amp 158 to the desired operating point when "+V" and "−V" power supply voltages 122 and 126 are at their proper potentials. Resistors 179, 181, and 183 similarly bias op amp 158 to its normal operating point when the "+$V_{12}$" power supply voltage on lead 120 is at its proper potential.

D. Output Stage

Output stage circuit 68 is comprised of a Darlington transistor 182, an emitter cutoff resistor 164, a diode 184 and capacitor 186. Transistor 182 is turned on proportionally by the signal on lead 67. Diode 184 acts as a back diode for fuel metering pump motor 70, and noise suppression is provided by capacitor 186.

E. Mechanical Section

Referring to FIG. 5C, the mechanical section is comprised of fuel metering pump motor 70, shaft 71, fuel metering pump 72, turbine 16, output shaft 73, alternator 74 and tachometer generator speed pickup 82. Fuel metering pump motor 70 is driven by the signal on lead 69 to operate at a speed sufficient to satisfy the minor loop controlling fuel metering pump speed. In addition it satisfies the principal control loop of turbine speed while in speed control and regulates fuel according to segments 38 and 46 while in temperature limit control.

F. Fuel Pump Speed Frequency to Voltage Converter

Speed feedback information for the minor loop is obtained from the fuel metering pump shaft 71 by tachometer generator speed pickup 82 and is transmitted by lead 84 to the fuel pump frequency to voltage convertor circuit 86. The signal on lead 84 is clipped and filtered by a resistor 185, a pair of diodes 187 and a capacitor 188. A comparator 190 operates with hysteresis due to a resistor 192, making use of the frequency proportional to speed by converting the signal on lead 84 into a square wave and driving two differentiator circuits, the first of which is comprised of a capacitor 193 and a resistor 194 and is driven directly. The second differentiator is comprised of a capacitor 196 and a resistor 198 and is driven by means of an inverting transistor 200 and resistors 202, 204, 206, and 208. A pair of diodes 210 combine output pulse signals from the differentiator circuits and provide a digital pulse train signal to a resistor 212 with one pulse occuring for every zero crossing of the signal on lead 84. Resistors 212 and 214 and a capacitor 216 provide scaling and filtering for the digital pulse train signal which is then transmitted to a precision timer 218. In the preferred embodiment, precision timer 218 is a manufacturer's type LM322 Precision Timer integrated circuit, manufactured by National Semiconductor, Inc. Resistors 220, 222, and 224 and capacitor 226 are necessary for proper operation of precision timer 218 according to the manufacturer's catalog recommendations. Resistors 230 and 232 and capacitors 234 and 236 operate as a low pass filter to integrate a constant pulse-width variable duty cycle waveform output impressed upon a load resistor 228 by precision timer 218. Op-amp 238 and resistors 240 and 242 operate to provide an analog voltage output (the FPFV signal) on lead 88 proportional to the speed of fuel metering pump motor 70.

G. Alternator Frequency to Voltage Converter

Referring again to FIG. 5A, alternator frequency to voltage convertor circuit 78 receives an AC signal on lead 76 from alternator 74. Resistors 244 and 246 and capacitor 248 provide scaling and filtering for the signal on lead 76. A resistor 260 and a capacitor 262 form a low pass filter for an output signal from tachometer subsystem 250. In the preferred embodiment, tachometer subsystem 250 is part of an integrated circuit manufacturer's type uA7350 manufactured by Fairchild Semiconductor Components Group of Fairchild Camera and Instrument Corporation. The uA7350 integrated circuit includes tachometer subsystem 250, op amp 266 and comparators 190 and 318. The ratio of resistor 264 to the sum of resistors 260 and 268 sets the DC amplification of op amp 266; a capacitor 270 and resistor 264 cause op amp 266 to have a first order low pass filter characteristic. Capacitors 272 and 258, and resistors 252, 254 and 256 are necessary for proper operation of the uA7350 integrated circuit according to the manufacturer's catalog recommendations. Resistors 274, 276, 278 and 280 comprise an input biasing and balancing circuit for op amp 266. The AFV signal on lead 80 is an analog voltage whose magnitude is proportional to speed of output shaft 73 of turbine 16. In the preferred embodiment, the AFV signal on lead 80 is +1.5 V at zero turbine speed (point 32 of FIG. 3) and has a linear characteristic with respect to turbine speed ending at −1 V at full load full speed (point 48 of FIG. 3).

H. Minimum Fuel Schedule

Referring again to FIG. 5B, minimum fuel schedule circuit 92 insures that a minimum amount of fuel will be provided to turbine 16 during deceleration to prevent loss of combustion. This limit is shown as segment 54 on the fuel schedule of FIG. 3. The slope of segment 54 is adjustable by means of a DECEL GAIN potentiometer 282. The offset of segment 54 is adjustable by means of a DECEL BIAS potentiometer 284. Resistors 286 and 288 sum signals from DECEL GAIN and DECEL BIAS potentiometers 282 and 284 into op amp 158 of summing amplifier circuit 66. Resistors 290 and 292 and capacitor 294 provide input scaling and filtering for the AFV signal on lead 80 as it enters minimum fuel schedule circuit 92.

I. Start Mode Control

Referring again to FIG. 5A, the start mode control circuit 98 is activated by closure of start switch 108. By means of additional equipment (not shown) other connections of start switch 108 will energize a starter motor, simultaneously accelerating turbine 16 and providing for ignition in the combustor. A resistor 296 and a diode 300 protect against transients from start switch 108. Resistors 298 and 308 limit base current to transistors 304 and 310 when start switch 108 is closed. During initial acceleration upon start-up, base current switches transistor 304 to its "on" state, providing a voltage across a START potentiometer 306 with the collector supply taken from the AFV signal on lead 80. An adjustable voltage level is thus obtainable by means of START potentiometer 306 to determine the amount of fuel supplied at point 36 of FIG. 3. This adjustable voltage is transmitted by lead 100 to the temperature limit stage circuit 96. As turbine speed increases, the AFV signal decreases linearly, gradually reducing the voltage across the START potentiometer 306. A diode 302 prevents transistor 304 from remaining in its "on" state above idle speed (point 44 of FIG. 3) during the first acceleration upon start up in the event start switch 108 is maintained closed above idle speed.

Also upon closure of start switch 108, transistor 310 is switched to its "on" state, discharging capacitor 312 through resistor 314 in circuit 102 through lead 110, thereby holding transient fuel boost and enable circuit 102 "not enabled". When start switch 108 is opened, transistor 304 will be "cut-off" causing the signal on lead 100 to be essentially the same as that on lead 80 since the resistance of potentiometer 306 is much less than summing resistor 316 in temperature limit stage circuit 96. By "cutting-off" transistor 304, operation is shifted from starting fuel schedule segment 38 to segment 39 if turbine 16 is below idle speed at that time. When start switch 108 is opened, transistor 310 is also "cut-off" putting circuit 102 in a condition to be enabled by "releasing" the non-inverting input of a comparator 318 in circuit 102.

J. Transient Fuel Boost and Enable

Referring again to FIGS. 3 and 5B, once operation is such as to drop below maximum acceleration fuel schedule 46 after start switch 108 is opened, comparator 318 will switch from a negative to a positive output due to a negative voltage signal on lead 106 coupled to comparator 318 by a diode 322 and a resistor 330, thus "enabling" transient fuel boost and enable circuit 102. Once switched to its positive output condition, comparator 318 will remain in that condition because of an input biasing circuit comprised of diodes 320, capacitor 324, and resistor 328, and a feedback resistor 326. Comparator 318 will be reset to its negative output condition (putting circuit 102 in its "not-enabled" condition) each time transistor 310 is switched "on" during starting. While comparator 318 is in its negative output condition, a transistor 336 is held "cut-off" by a resistor 334. In the preferred embodiment a resistor 338 is 1 megohm, providing a discharge path for a capacitor 342 during "cut-off" of transistor 336. When comparator 318 switches to its positive output condition, transistor 336 is switched "on" through a base resistor 332, and acts to effectively short one side of capacitor 342 to circuit common 339 through a resistor 340. Resistors 340 and 344 and capacitor 342 comprise a switched low-pass filter operating on the temperature limit signal on lead 89. The temperature limit signal on lead 89 controls steady state operation along fuel flow schedule segment 46. Once the low-pass filter operating on lead 89 is switched "on", a rapid increase called for in turbine speed will result in an overshoot in fuel flow 30 of FIG. 2B. The amount of energy contained in overshoot of fuel flow 30 is set by resistors 340, 344, and 346 (in circuit 96) and capacitor 342 such that the thermal mass of the combustor of the gas turbine engine 16 is utilized to permit a rapid temperature increase, but without overshoot in turbine temperature 28.

K. Temperature Limit Stage

Referring again to FIGS. 3 and 5C, slope of segment 46 is set by a TEMP LIMIT potentiometer 348 and scaled by resistors 344 and 346. Offset of segment 46 is set by means of an OFFSET potentiometer 352 and a resistor 354. The slope and offset of segment 46 are both further modified by inlet air temperature sensor 356, located such as to be sensitive to combustor inlet air temperature. In the preferred embodiment, sensor 356 is a JA35J1 (5 kOHM at 25° C.) thermistor manufactured by Fenwal Electronics Division of Walter Kidde & Co., Inc. The reason that sensor 356 modifies both slope and offset of segment 46 is that the signal modified by sensor 356 is a combination of the AFV signal (affecting slope) on lead 80, fed through resistor 358, and a fixed bias from "−V" (affecting offset) fed through resistor 360. Resistors 362, 364, and 366 complete a scaling and balancing input network for op amp 350. Capacitor 368 is a noise suppression capacitor. A resistor 370 and a capacitor 372 provide proportional plus integral feedback for op amp 350. A resistor 374 and diodes 376 prevent the signal on lead 94 from becoming negative when the output from op amp 350 on lead 106 has a negative polarity. Referring again to FIG. 3, during initial acceleration upon start-up, maximum fuel flow is scheduled from point 36 along segment 38 to point 44. During that time the signal on lead 100 programs the temperature limit stage circuit 96 through resistor 316 to operate along the increased fuel flow schedule of segment 38 up to full-load idle speed at point 44. At speeds above IDLE SPEED, operation may be in speed control or temperature limit control. If the load imposed on turbine 16 calls for operation above segment 46, operation will be in temperature limit control with steady state fuel flow limited to a point on segment 46. Generally a reduction in speed will cause a reduction in load on output shaft 73, moving along segment 46 toward point 44 until a stable operating point is attained. Further, if the load is such as to continue to call for operation above segment 46 even though turbine shaft speed is decreasing, actual operation will continue to be limited to segments 46 and 39 and their extension down to point 34 and the combustor temperature will accordingly be limited to a safe or non self-destructive value even at very low speeds.

Fuel is prevented from flowing at point 32 when turbine 16 is not rotating, by a negative offset of the extension of segments 39 and 46, which passes through the abscissa of FIG. 3 at point 34 which may be, for example, 5% of the full load full speed of turbine 16.

L. Positive Power Supply

Referring to FIG. 5D, power is supplied from a 12 volt battery 116 through a fuse 114. A diode 378 provides reverse polarity protection, and a diode 380 provides temperature compensation for a zener diode 384. A ballast resistor 382 completes positive power supply circuit 118 which supplies the "+V" power on lead 122 to the remaining circuits.

M. Negative Power Supply

Resistor 386 is an input ballast resistor for negative power supply circuit 124. A capacitor 388 provides filtering. A diode 390, transistor 392, resistors 394 and 396, capacitor 398 and transformer 400 comprise a conventional oscillator circuit to provide a means of obtaining negative polarity power. A diode 408 and a capacitor 410 rectify and filter the oscillator output to provide unregulated negative polarity power on lead 411. An alternative embodiment to the oscillator circuit (not shown) is to provide a conventional full wave diode bridge and capacitor filter between the output of alternator 74 and lead 411. The remainder of negative power supply circuit 124 is comprised of a ballast resistor 412, diodes 414 and a zener diode 416. Negative power supply circuit 124 supplies "−V" power on lead 126 to the remaining circuits.

N. Safety Circuit

Lead 120 carries +12 volt fused power to the "+V$_{12}$" circuit connections throughout the system.

Safety circuit 112 monitors signals on leads 80 and 69 and removes power to the entire electronic fuel control system when a turbine overspeed or fuel metering pump motor overvoltage condition is sensed. The AFV signal on lead 80 is compared by a resistor 420 with a fixed reference voltage set by resistor 422. Resistor 424 is a balancing resistor. When a turbine overspeed condition occurs, the AFV signal on lead 80 will exceed the fixed reference voltage, causing an open loop op amp 428 to go from a negative to a positive polarity output on lead 430. The signal on lead 430 is one input to an OR gate comprised of resistors 432 and 434 and diodes 436. The output of another open loop op amp 460 is a second OR gate input. When either input to the OR gate has a positive polarity, a transistor 438 is switched "on" causing gate current to flow through resistor 440 to the gate of thyristor 418, triggering thyristor 418 and interrupting fuse 114. Resistor 442 provides a low impedance source for gate of thyristor 418 when transistor 438 is "cut-off." Capacitors 444 and 446 provide noise suppression.

The fuel metering pump motor armature voltage signal on lead 69 is summed through a resistor 456 to op amp 460. A filter capacitor 458 is necessary to reduce ripple present on lead 69, and to add a slight delay to the signal on lead 69 to prevent false tripping of op amp 460. A capacitor 466 provides noise suppression, and proper power-on sequencing. A diode 452, resistor 454 and a transistor 450 discharge capacitor 458 upon a rapid decrease in voltage on lead 69, thus preventing false overvoltage detection by op amp 460. The signal on lead 69 is compared with a maximum reference voltage set by resistors 462 and 464. When a pump motor overvoltage condition occurs, the signal on lead 69 will exceed the maximum reference voltage, causing op amp 460 to switch from a negative to a positive polarity output, and (through the second input of the diode OR gate) trigger thyristor 418 to interrupt fuse 114.

It is to be understood that the invention has been described with reference to specific embodiments which provide the features and advantages previously described, and that such specific embodiments are susceptible of modification, as will be apparent to those skilled in the art. Accordingly, the foregoing description is not to be construed in a limiting sense.

ELECTRONIC FUEL CONTROL SYSTEM COMPONENTS

The following is a list of components for the preferred embodiment of electronic fuel control system. Unless otherwise noted: (1) resistors are indicated as "R" and are 5%, ¼ watt, with the resistance in OHMS; (2) capacitors are indicated as "C" with the capacitance in microfarads; (3) diodes are indicated as "D" and are type IN4154; and (4) potentiometers are 2 KOHM, 10 turn.

| Reference Numeral | Component Type and Value | Notes |
|---|---|---|
| 70 | Fixed field DC motor | 0 to 8 volts, 2.5 Amps Max. |
| 74 | Alternator | 360 Hz at 100% speed |
| 82 | Tachometer generator | 8 pole-pairs/revolution |
| 87 | 100K, 1% R | |
| 95 | 4.7K R | |
| 114 | 4 AMP Fuse | SFE-4 |
| 128 | 5K - Potentiometer | 1 Turn |
| 132 | 200 R | |
| 134 | 1K R | |
| 136 | 0.01 C | |
| 138 | 15K, 1% R | |
| 140 | Operational amplifier | National Semiconductor Corp. Type LM2902 |
| 142 | 33K, 1% R | |
| 144 | 360K R | |
| 146 | D | IN484A |
| 150 | 0.03 C | |
| 153 | 10K R | |
| 154 | 47K R | |
| 156 | 2.7K R | |
| 158 | Operational Amplifier | National Semiconductor Corp. Type LM2902 |
| 162 | 270 R | |
| 164 | 270 R | |
| 166 | 470pf C | |
| 167 | 2.2K R | |
| 168 | 470K R | |
| 169 | 7.5K R | |
| 170 | 0.1 C | |
| 174 | D | IN484A |
| 178 | 1.5K R | |
| 179 | 10K R | |
| 180 | 3K R | |
| 181 | 10 R | |
| 182 | Darlington Transistor | Motorola Inc. Type MJE700 |
| 183 | 30K R | |
| 184 | D | IN4002 |
| 185 | 10K R | |
| 186 | 1.0 C | |
| 188 | 0.1 C | |
| 190 | Comparator | In Fairchild Semiconductor Corp. Type uA7350 |
| 192 | 220K R | |
| 193 | 0.01 C | |
| 194 | 10K R | |
| 196 | 0.01 C | |
| 198 | 10K R | |
| 200 | Transistor | 2N6076 |
| 202 | 20K R | |
| 204 | 47K R | |
| 206 | 4.7K R | |
| 208 | 10K R | |
| 212 | 10K R | |
| 214 | 47K R | |
| 216 | 0.001 C | |
| 218 | Precision Timer | National Semiconductor Corp. Type LM322N |
| 220 | 34.2K, 1% R | |
| 222 | 8.45K, 1% R | |
| 224 | 5.23K, 1% R | |
| 226 | 0.01 C | |
| 228 | 1K R | |
| 230 | 22K R | |
| 232 | 22K R | |
| 234 | 0.1 C | |
| 236 | 0.1 C | |
| 238 | Operational Amplifier | National Semiconductor Corp. Type LM2902 |
| 240 | 110K, 1% R | |
| 242 | 1% R | |
| 244 | 10K R | |
| 246 | 1K R | |
| 248 | 0.1 C | |
| 250 | Tachometer subsystem | In Fairchild Semiconductor Corp. Type uA7350 |
| 252 | 22K R | |
| 254 | 4.7K R | |
| 256 | 1% R | See Note 3 |
| 258 | 0.01 C | |
| 260 | 47.5K, 1% R | |
| 262 | 0.47 C | |
| 264 | 71.5K, 1% R | |
| 266 | Operational Amplifier | In Fairchild Semiconductor Corp. Type uA7350 |
| 268 | 47.5K, 1% R | |
| 270 | 0.033 C | |
| 272 | 0.01 C | |
| 274 | 1% R | See Note 2 |
| 276 | 4.75K, 1% R | |
| 278 | 4.75K, 1% R | |
| 280 | 4.75K, 1% R | |
| 286 | 4.7K R | |
| 288 | 470K, 1% R | |
| 290 | 10K R | |
| 292 | 10K R | |
| 294 | 15.0 C | |
| 296 | 10K R | |
| 298 | 120K R | |
| 304 | Transistor | 2N5172 |
| 308 | 120K R | |
| 310 | Transistor | 2N5172 |
| 312 | 1.0 C | |
| 314 | 47 R | |
| 316 | 249K, 1% R | |
| 316 | 249K, 1% R | |
| 318 | Comparator | In Fairchild Semiconductor Corp. Type uA7350 |
| 324 | 10.0 C | |
| 326 | 1K R | |
| 328 | 82K R | |
| 330 | 33K R | |
| 332 | 10K R | |
| 334 | 4.7K R | |
| 336 | Transistor | 2N4123 |
| 338 | 1M R | |
| 340 | 51K R | |
| 342 | 15.0 C | |
| 344 | 47.5K, 1% R | |
| 346 | 47.5K, 1% R | |
| 350 | Operational Amplifier | National Semiconductor Corp. Type LM2902 |
| 353 | 12K R | |
| 354 | 100K R | |
| 356 | Thermistor | Fenwal Type JA35J1 |
| 358 | 1.5K R | |
| 360 | 3.3K R | |
| 362 | 10K R | |
| 364 | 39K R | |
| 366 | 301K 1% R | |
| 368 | 470pf C | |
| 370 | 100K R | |
| 372 | 0.1 C | |
| 374 | 1K R | |
| 374 | 1K R | |
| 376 | D | 1N914 |
| 378 | D | 1N4003 |
| 380 | D | 1N4003 |
| 382 | 50,5W R | |
| 384 | Zener Diode | 1N4733 |
| 386 | 12, 10W R | |
| 388 | 100 C | |
| 390 | D | 1N4003 |
| 392 | Transistor | General Electric Co. |

-continued

| Reference Numeral | Component Type and Value | Notes |
|---|---|---|
| | | Type D45C12 |
| 394 | 1K, 1W R | |
| 396 | 33, 1W R | |
| 398 | 0.0047 C | |
| 400 | Transformer | |
| 402 | Winding | 75 turns #28 wire |
| 404 | Winding | 75 turns #28 wire |
| 406 | Winding | 150 turns #28 wire |
| 408 | D | 1N4003 |
| 410 | 100 C | |
| 412 | 33 2W R | |
| 414 | D | 1N4003 |
| 416 | Zener Diode | 1N5338 |
| 418 | Thyristor | 2N4185 |
| 420 | 39K, 1% R | |
| 422 | 1% R | See Note 4 |
| 424 | 27K R | |
| 426 | 0.01 C | |
| 428 | Operational Amplifier | National Semiconductor Corp. Type LM358N |
| 432 | 1.5K R | |
| 434 | 1.5K R | |
| 438 | Transistor | 2N5172 |
| 440 | 33 R | |
| 442 | 1K R | |
| 444 | 100 C | |
| 446 | 0.01 C | |
| 450 | Transistor | 2N6076 |
| 454 | 1K R | |
| 456 | 100K R | |
| 458 | 1.0 C | |
| 460 | Operational Amplifier | National Semiconductor Corp. Type LM358N |
| 462 | 100K R | |
| 464 | 330K R | |
| 466 | 0.01 C | |

Notes:
1. Select resistor 242 for 0.7v on lead 88 while applying 100 Hz input on lead 84.
2. Select resistor 274 for +1.5v on lead 80 with no input on lead 76 before performing selection in Note 3.
3. Select resistor 256 for −1v on lead 80 while applying 362 Hz on lead 76.
4. Select resistor 422 for switching of comparator 428 from low to high on lead 430 at 387 Hz on lead 76.

ADJUSTMENT PROCEDURE

1. Adjust MAX SPEED and SPEED DEMAND pots 130 and 128 for maximum voltage on lead 63.

2. Disconnect lead 76 from alternator 74 and apply a sine wave with a frequency (F1) corresponding to full load idle speed point 44 of FIG. 3 to lead 76. Frequencies F1 through F7 should be nominally 24 volts peak to peak.

3. Adjust OFFSET pot 352 for proper fuel pump speed to provide fuel flow for full load idle speed point 44 of FIG. 3.

4. Apply a sine wave with a frequency (F3) corresponding to full load, full speed point 48 of FIG. 3 to lead 76.

5. Adjust TEMPERATURE LIMIT pot 348 for proper fuel pump speed to provide fuel flow for full load full speed point 48 of FIG. 3.

6. Adjust SPEED DEMAND pot 128 for zero volts on lead 63.

7. Apply a sine wave with a frequency (F4) corresponding to point 55 of FIG. 3 to lead 76.

8. Adjust DECEL BIAS pot 284 for proper fuel pump speed to provide fuel flow necessary to maintain combustion at point 55 of FIG. 3.

9. Apply a sine wave with a frequency (F5) corresponding to point 53 of FIG. 3 to lead 76.

10. Adjust DECEL GAIN pot 282 for proper fuel pump speed to provide fuel flow necessary to maintain combustion at point 53 of FIG. 3.

11. Apply a sine wave with a frequency (F6) corresponding to the midpoint of segment 58 of FIG. 3 to lead 76.

12. Adjust IDLE SPEED pot 152 for proper fuel pump speed to provide fuel flow at the midpoint of segment 58 of FIG. 3.

13. Apply a sine wave with a frequency (F7) corresponding to the midpoint of segment 50 to lead 76.

14. Adjust SPEED DEMAND pot 128 for maximum voltage on lead 63.

15. Adjust MAX SPEED pot 130 for proper fuel pump speed to provide fuel flow at the midpoint of segment 50 of FIG. 3.

16. Remove the signal from lead 76.

17. Close start switch 108.

18. Adjust START pot 306 for proper fuel pump speed to provide fuel flow at point 36 of FIG. 3.

What is claimed is:

1. An Electronic Fuel Control System for Gas Turbine Engine of the type wherein fuel is supplied in response to a speed demand signal and in accordance with a predetermined fuel schedule; said fuel control system comprising:
   a. start mode means operative to sequence said predetermined fuel schedule from a starting fuel schedule to a running fuel schedule when said turbine engine is accelerating from a low speed to a high speed during starting and further operative to prevent sequencing said predetermined fuel schedule from said running fuel schedule to said starting fuel schedule upon deceleration of said gas turbine engine from a high speed to a low speed; and
   b. Fuel boost means
      i. held inoperative by said start mode means during said starting schedule, and
      ii. operative during said running fuel schedule in response to an increased speed demand signal to transiently increase the amount of fuel supplied in excess of that called for by said predetermined fuel schedule where said transient increase overshoots that amount of fuel called for by said predetermined fuel schedule during acceleration of said engine.

2. An improved electronic fuel control system for a gas turbine engine of the type wherein fuel is supplied according to a predetermined fuel schedule, control means are operative to regulate turbine shaft speed and to generate a control signal as a function of said shaft speed and said fuel schedule, and fuel delivery means are operative to receive said control signal and to supply fuel to said gas turbine engine as a function thereof, the improvement which comprises:
   a. Fuel boost means operatively enabled after starting to transiently exceed said predetermined fuel schedule by an amount which is sufficient and in the form of an overshoot signal to allow an increased rate of acceleration of said turbine shaft speed; and
   b. Start mode means operative to hold said fuel boost means not enabled during starting and to enable said fuel boost means after starting; said start mode means further operative to sequence said predetermined fuel schedule from a starting fuel schedule to a running fuel schedule when initially starting said turbine engine and further operative to prevent sequencing of said predetermined fuel schedule from said running fuel schedule to said starting fuel schedule thereafter.

3. An improved electronic fuel control for a gas turbine engine of the type having a first control mode operative to regulate turbine shaft speed and a second control mode operative to limit turbine temperature, the improvement which comprises:

a. Turbine speed means operative to sense said turbine shaft speed and to generate a turbine speed signal representative thereof;
   b. Reference means operative to provide a demand signal representative of demanded turbine shaft speed;
   c. Regulator means operative to receive said demand and turbine speed signals and to generate an error signal representative of the difference therebetween;
   d. Sensor means operative to detect the inlet air temperature of the turbine engine and to provide an inlet air temperature signal proportional thereto;
   e. Temperature limiting means operative to receive said inlet air temperature signal and said turbine speed signal and to provide a turbine temperature limiting signal to limit turbine temperature as a function of inlet air temperature and turbine shaft speed;
   f. Deceleration means operative to provide a minimum fuel flow signal as a predetermined deceleration schedule;
   g. Summing means operative to combine said error, temperature limiting, and minimum fuel flow signals and to provide an output signal representative of the algebraic combination thereof;
   h. Fuel delivery means operative to accept said output signal and to provide fuel to said gas turbine engine at a rate proportional to said output signal;
   i. Fuel boost means operative when enabled to detect an increase in said turbine shaft speed and to transiently overshoot said turbine temperature limiting signal to permit a more rapid increase in said turbine shaft speed; and
   j. Start mode means operative to hold said fuel boost means not enabled during initial starting of said gas turbine engine and further operative to release said fuel boost means during running of said gas turbine engine after starting to allow said fuel boost means to become enabled during said running; said start mode means further operative to sequence said predetermined fuel schedule from a starting fuel schedule to a running fuel schedule when initially starting said turbine engine and further operative to prevent sequencing from said running fuel schedule to said starting fuel schedule thereafter.

4. The system of claim 1 wherein said control means further comprises:
   a. A principal control loop regulating turbine shaft speed; and
   b. A minor loop regulating said supply of fuel subject to limiting by said fuel schedule.

5. The system of claim 1 wherein said sequence of said fuel schedule further comprises:
   a switched temperature limit means responsive to a start signal input and operable to provide said starting fuel schedule upon first application of said start signal and to provide said running fuel schedule upon the removal of the first application of said start signal to said switched temperature limit means.

* * * * *